United States Patent [19]

Kennedy et al.

[11] 4,132,237
[45] Jan. 2, 1979

[54] EXCESS FLOW SHUTOFF VALVE FOR HAZARDOUS FLUIDS

[75] Inventors: Garth P. Kennedy; William A. Kennedy, Jr.; Neal R. Kennedy, all of Oklahoma City; John W. Elder, Tulsa, all of Okla.

[73] Assignee: Corken Pump Company, Oklahoma City, Okla.

[21] Appl. No.: 682,892

[22] Filed: May 3, 1976

[51] Int. Cl.² ............... F16K 13/04; F16K 17/40; F04B 49/02
[52] U.S. Cl. ...................... 137/75; 251/45; 251/46; 417/32
[58] Field of Search ............ 137/75, 77; 251/45, 251/46

[56] References Cited

U.S. PATENT DOCUMENTS

| 269,886 | 1/1883 | Cock | 251/46 |
|---|---|---|---|
| 2,859,758 | 11/1958 | Jurs | 137/75 |
| 2,933,257 | 4/1960 | Clark | 251/46 |
| 3,070,109 | 12/1962 | Crandall | 137/77 |
| 3,253,615 | 5/1966 | Armstrong | 251/46 |
| 3,379,406 | 4/1968 | Greer | 251/45 |
| 3,556,464 | 1/1971 | Griswold | 251/46 |
| 3,791,619 | 2/1974 | Pett | 251/45 |
| 3,957,244 | 5/1976 | Chauvigne | 251/45 |

FOREIGN PATENT DOCUMENTS

| 160/320 | 11/1970 | Fed. Rep. of Germany | 137/75 |
|---|---|---|---|
| 567219 | 2/1924 | France | 251/45 |
| 23071 | 1/1966 | Japan | 251/45 |

Primary Examiner—William L. Freeh
Attorney, Agent, or Firm—Clarence A. O'Brien; Harvey B. Jacobson

[57] ABSTRACT

A shutoff valve installed on the discharge side of a pump to automatically shutoff hazardous liquid flow in the event of a rupture on the downstream side of the shutoff valve. The shutoff valve operates in response to a predetermined pressure drop across a valve and may also function to stop the driver of the pump and close the shutoff valve in response to excessive temperature conditions. Various installational arrangements may be provided in order to associate the shutoff valve with the hazardous fluid flow line.

10 Claims, 21 Drawing Figures

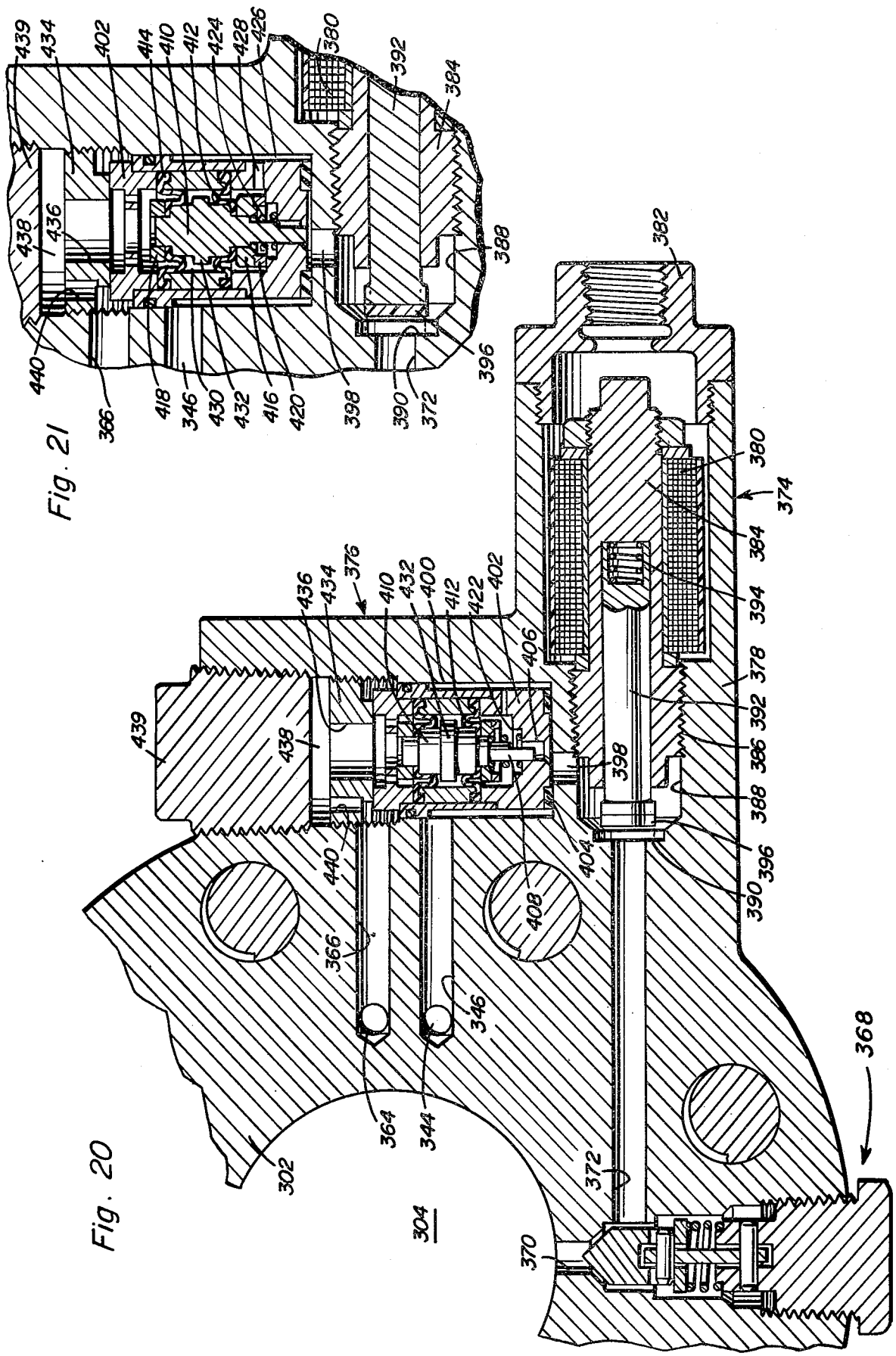

EXCESS FLOW SHUTOFF VALVE FOR HAZARDOUS FLUIDS

BACKGROUND OF THE INVENTION

1. FIELD OF THE INVENTION

The present invention generally relates to shutoff valve structures and more particularly an excess flow shutoff valve for use in hazardous fluid flow lines in which the shutoff valve will be activated to prevent discharge of hazardous fluids from the flow line in the event of abnormal conditions such as rupture of the flow line downstream of the valve or excessive temperature rise.

2. DESCRIPTION OF THE PRIOR ART

In many instances, hazardous fluids must be handled under cotrolled conditions since such fluids may be toxic, flammable or otherwise hazardous if discharged in an uncontrolled manner since release of such fluids to the atmosphere may endanger life and property. It has been the practice and in most instances, there is a requirement that the handling of such materials include a protective valve installed in the piping system to provide a means to protecting personnel and property from accidents caused by excessive product loss due to rupture of pipelines, hose, fittings or equipment connected to the piping. Conventional excess flow valves are designed to close at flow rates in excess of their normal rated flows thus requiring that the rupture in the system permit a flow in excess of the rated flow of the valve in order for it to close. Such valves normally involve a valve disc which is held in an open position by a calibrated spring so that when the flow of product creates a pressure drop across the valve disc greater than the present load on the spring, the valve disc moves against a valve seat to a closed position. Such excess flow valves can be obtained in various flow ratings and since they depend on flow for closure, the line downstream of the excess flow valve must be larger enough to not excessively restrict the flow. Usually, excess flow valves are installed which have a rated closing flow approximately fifty percent greater than the anticipated normal flow. Otherwise, normal flow may cause valve chatter or cause the valve to slug close prematurely during normal operation. For example, if a 90 gpm rated valve is employed in a two inch line and a serious leak develops downstream leaking at the rate of less than 90 gpm, the excess flow valve will remain open and permit flow to the atmosphere thus obviously creating a serious hazard. The leakage rate would have to exceed 90 gpm to cause this valve to close and stop flow. Thus, the uncontrolled flow to the atmosphere must be a high volume in order to cause the presently available type excess flow valve to close. Various patents exist relating to excess flow valves with the following U.S. patents being exemplary of the development of the state of the art. U.S. Pat. Nos. 2,103,747; 2,600,309; 2,887,546; 2,862,051; 3,051,805; 3,113,189; 3,126,463; 3,238,323; 3,283,094; 3,325,612; 3,363,073; 3,549,276; 3,749,864; 3,786,211; 3,822,370; 3,851,127.

SUMMARY OF THE INVENTION

An object of the present invention is to provide an excess flow shutoff valve for hazardous fluids especially adapted for use in the LPG, and anhydrous ammonia industries or in any other installation where the flow of hazardous fluids is to be completely stopped in the event of a rupture or leak downstream from the shutoff valve.

Another object of the invention is to provide a shutoff valve utilizing the pressure drop across the valve port to open and close the valve with a diaphragm assembly being utilized to provide a positive seal between an inlet volume and an outlet volume.

A further object of the invention is to provide a shutoff valve in accordance with the preceding object in which solenoid valves are utilized to control the pressure in the inlet and outlet volumes.

Yet another object of the invention is the provision of a unique reed switch operated by a movable magnet having unique structure features enabling the device to be used internally of the flow path.

Still another object of the invention is to provide a shutoff valve in accordance with the preceding objects utilizing a pressure drop sensing switch which senses change in pressure regardless of the quantity of flow through the discharge volume.

A still further object of the invention is to provide a control arrangement which will enable normal operation of the system and ignore the first pressure drop which would occur when the hose end valve is opened but yet sense any subsequent pressure drop to operate the shutoff valve with a thermal sensing device and a deadman control also being incorporated into the control assembly.

Another object of the invention is to provide an external safety control valve incorporating a fusible link therein which is utilized in association with a manual valve for use in association with or independent of an automatic shutoff valve.

Yet another object of the invention is to provide a shutoff valve combining hydraulic action and electrical action which is adapted to be installed inside the product or supply tank.

Yet another feature of the present invention is to provide a shutoff valve in accordance with the preceding object in which a high viscosity fluid act as a time delay device for operation of the shutoff valve.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 20 is a transverse sectional view illustrating the structure of the solenoid valve, heat sensing valve and pressure drop valve in one position.

FIG. 21 is a fragmental sectional view of the solenoid valve and pressure drop valve in another position.

DESCRIPTION OF THE PREFERRED EMBODIMENTS

Figure 1:
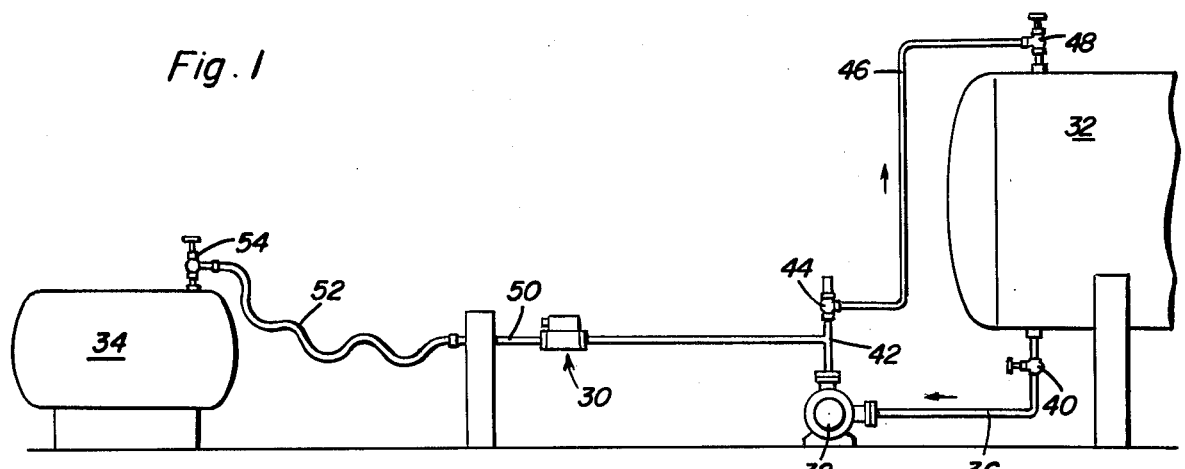
FIG. 1 is a schematic view of illustrating a typical installation of the shutoff valve of the present invention.
Figure 2:
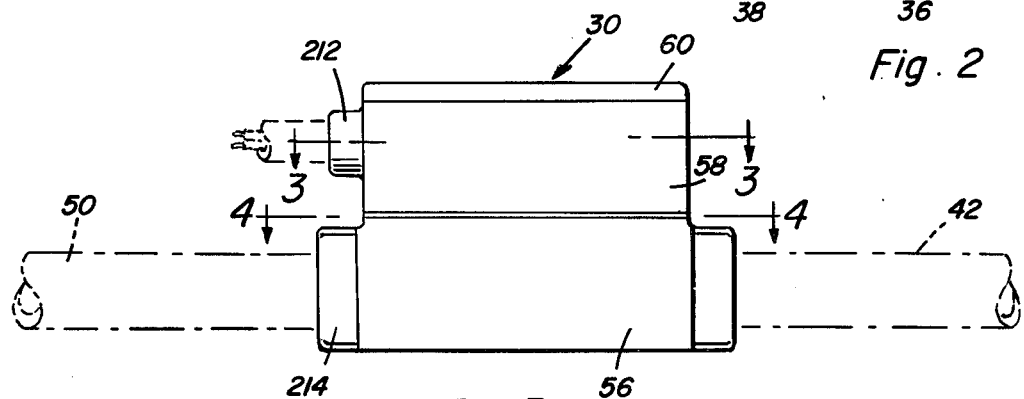
FIG. 2 is a side elevational view of the shutoff valve.
Figure 3:
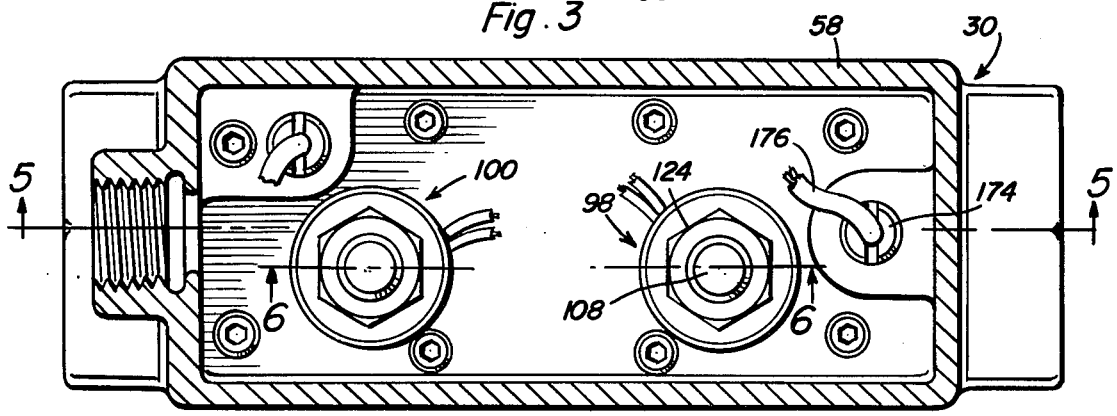
FIG. 3 is a longitudinal, plan sectional view taken substantially upon a plane passing along line 3—3 of FIG. 2 illustrating the orientation of certain components within the interior of the control box through which access may be had to these components.
Figure 4:
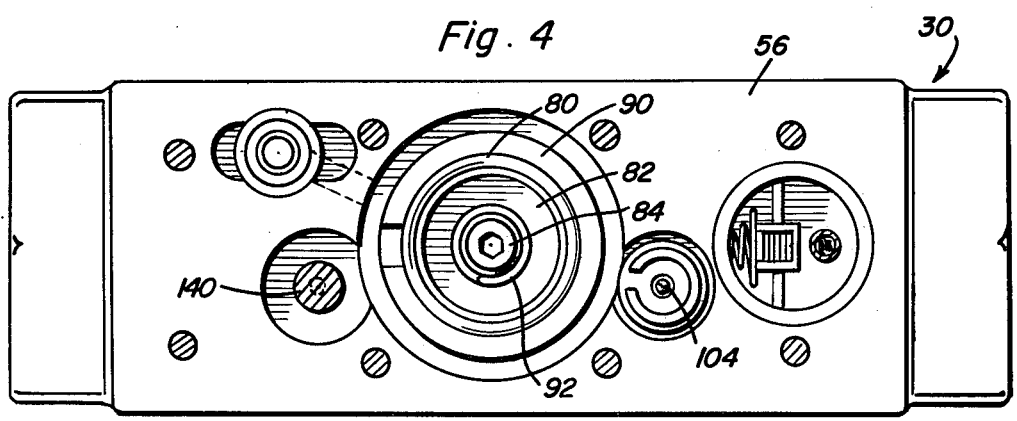
FIG. 4 is a longitudinal plan, sectional view taken generally along section line 4—4 illustrating the construction of the upper surface of the valve body.

Referring now specifically to FIG. 1 to the drawings, the shutoff valve of the present invention is generally designated by reference numeral 30 and is diagrammatically illustrated in association with other components of a system by which a hazardous fluid may be pumped from a supply tank 32 into a plurality of containers 34. For example, the supply tank 32 may be a bulk storage tank for anhydrous ammonia or LPG and the container 34 may be one of a series to be filled therefrom. The supply tank 32 is provided with a pipe 36 which forms an inlet pipe to a pump 38 with a suitable manual valve 40 being provided in the pipe 36 adjacent the tank 32. The pump 38 includes an outlet pipe 42 which extends to the shutoff valve 30 and is also provided with a by-pass valve 44 having a bypass line 46 communicated therewith which returns to the supply tank 32 with a suitable manual valve 48 being provided in the bypass line 46. A downstream pipe 50 extends from the shutoff valve 30 and is usually connected to a downstream hose 52 having a hose end shutoff valve 54 thereon by which the containers 34 may be filled. At any time the pump 38 is operating the hose end shutoff valve 54 is closed, the pump will continue to operate but will bypass fluid through the bypass valve 44 which is preset for bypassing fluid after the pressure in the outlet pipe 42 reaches a predetermined valve. During such normal operation, the hose end shutoff valve 54 is manually operated while the pump 38 continues to operate and the shutoff valve 30 does not become operative since the purpose of the shutoff valve 30 is to prevent discharge of hazardous fluids in the event the downstream pipe 50 or downstream hose 52 is ruptured or a leak in the system occurs downstream of the shutoff valve 30. The shutoff valve 30 is connected to the pipes 42 and 50 in a standard and conventional manner such as by threaded connection or the like and should be oriented as reasonably close as possible to the hose 52 as illustrated in FIG. 1

Figure 5:
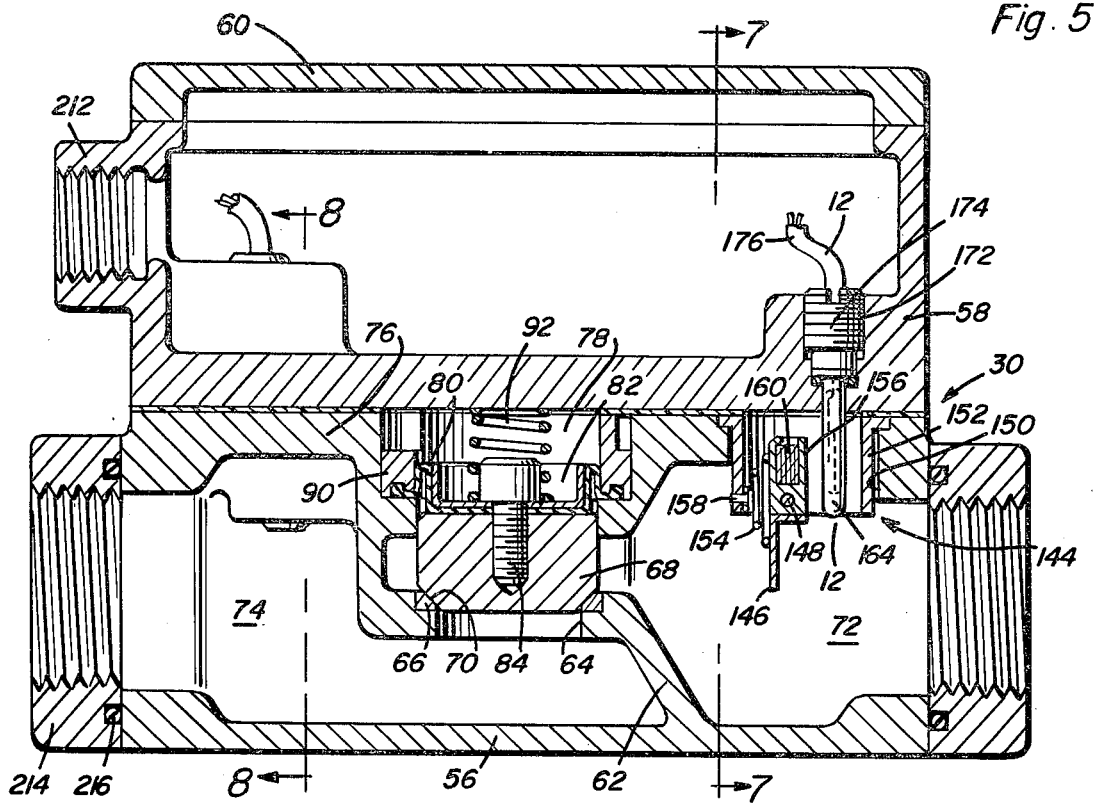
FIG. 5 is a longitudinal, sectional view taken substantially upon a plane passing along section line 5—5 of FIG. 3 illustrating the orientation or certain of the components of the shutoff valve.
Figure 6:
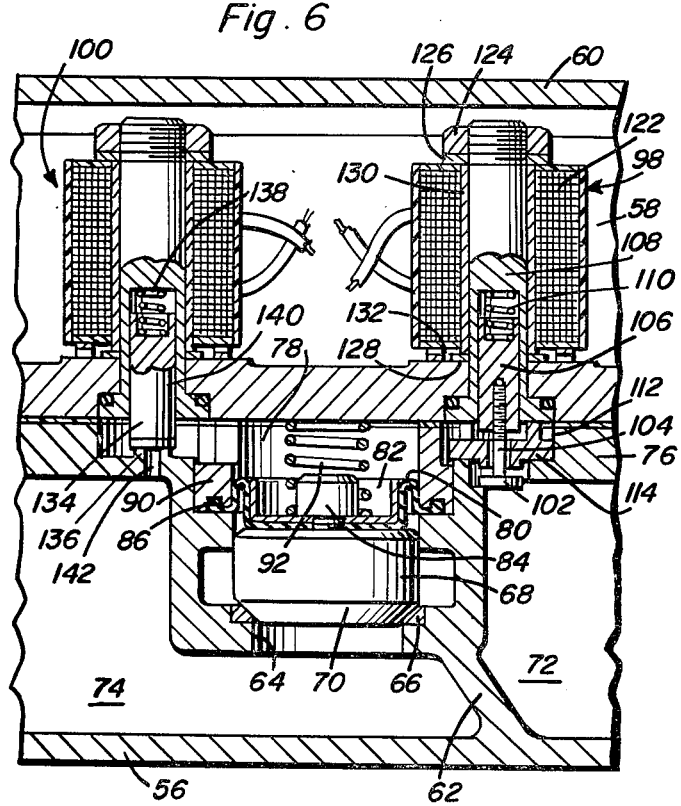
FIG. 6 is a fragmental longitudinal sectional view taken substantially upon a plane passing along section line 6—6 of FIG. 3 illustrating the structural details of a pair of solenoid valves incorporated into the shutoff valve.

The shutoff valve 30 includes a valve body 56 having a control box 58 mounted on top thereof and a cover 60 for the control box which is removable to enable access to the control box and certain components of the shutoff valve 30 are accessible by virture of the control box 58 being hollow and by virture of the control box 58 being removable from the top of the valve body 56. Centrally of the valve body 56, there is provided a horizontally disposed web or partition 62 having a central, vertically disposed port or opening 64 therethrough as illustrated in FIG. 5. The upper end of the port 64 is provided with a peripheral valve seat 66 which is engaged by an internal valve 68 having a beveled or truncated valve seat engaging face 70 to divide the valve body into two compartments or volumes designated as an inlet compartment or volume 72 and an outlet compartment or volume 74. The valve seat ring 66 may be constructed of plastic material of a type which is not attacked by the fluids passing through the valve body. The valve body 56 includes a top wall 76 having a compartment or volume 78 formed therein which is isolated and sealed from the compartment or volume 72 by a rolling diaphragm 80 which has a central portion secured to the internal valve 68 by a cylindrical cup 82 and a threaded fastener 84 in the form of a cap screw or the like. The periphery of the diaphragm 80 is provided with a rib 86 received in a peripheral groove 88 in the lower end of a generally cylindrical rolling diaphragm retaining ring 90 as illustrated in FIGS. 5 and 6. A compression coil spring 92 extends between the cup-shaped member 82 and the lower surface of the control box 58 in encircling relation to the head of the fastener 84 as illustrated in FIGS. 5 and 6 with the spring 92 serving to firmly hold the valve 68 against the valve seat 66 for closing the port 64 when the pressure in volume 72 and volume 78 are equal.

Figure 10:
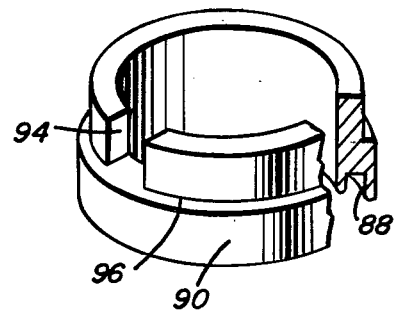
FIG. 10 is a prospective view of the retaining ring for the rolling diaphragm.

As illustrated in FIG. 10, the retainer ring 90 is provided with a notch 94 therein communicating the interior of the ring with the exterior thereof which is provided with a peripheral recess 96 on the exterior upper end surface thereof and it is pointed out that the inner edge of the groove 88 is slightly shorter than the outer edge of the groove to receive the portion of the diaphragm 80 extending thereunder so that the action of the control box 58 when in place serves to retain the valve components, rolling diaphragm, retaining ring and spring in assembled and sealed relation with the diaphragm 80 forming an effective seal between volume 72 and volume 78.

Figure 11:
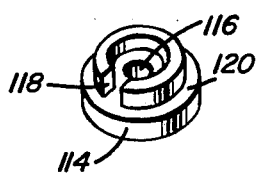
FIG. 11 is a prospective view of a valve seat associated with one of the solenoid valves.

The pressure in volume 74 is always equal to or less than the pressure in volume 72 and the pressure in outlet volume 74 can never exceed that in inlet volume 72 since if this would occur, the valve 68 would open and thus equalize the pressure. When there is flow across port 64, there also is a pressure drop across port 64 simply because there must be pressure drop for there to be flow. Therefore, under flow conditions, the pressure in outlet volume 74 is less than that in inlet volume 72. Diverting the pressure in volume 78 from the pressure of volume 72 to the pressure of volume 74 causes valve 68 to lift and this switching pressure action is the purpose for a pair of longitudinally spaced solenoid valves 98 and 100 which are illustrating specifically in FIG. 6. Solenoid valve 98 includes a valve member 102 which includes a threaded stem 104 connected to a piston 106 which is slidably received within sleeve 108. The piston 106 is biased downwardly by a spring 110 engaged with a cup-shaped recess in the upper end of the piston and the inner end of the hollow portion of the sleeve 108. The top wall 76 of the valve body 56 includes a recess 112 in which a valve seat 114 is received with FIG. 11 illustrating in more detail the specific contruction of the valve seat 114 which includes a central opening 116 and a notch 118 extending radially from a point adjacent the opening 116 to a peripheral recess 120. The valve stem 104 extends through the opening 116 and the valve member 102 is normally spaced from the downwardly facing edge of the valve seat so that it is normally open but, when the piston 106 moves upwardly, the valve member 102 will enage the valve seat 114. Thus, the force of piston spring 110 holds valve 102 away from seat 114 and the pressure of volume 72 passes into volume 78 through the annular recess 96 and notch 94 in ring 90. When the solenoid coil 122 is energized, a magnetic field is established that overcomes the force of spring 110 and causes piston 106 which is actually the core of the solenoid to move upwardly until valve 102 seals against the valve seat. Thus, with the solenoid valve 98 in this position, the pressure in inlet volume 72 can no longer be transmitted to volume 78. While the solenoid valves have been shown in vertical position, they will operate in any orientation.

The solenoid valve 98 is installed in the valve body 56 and control box 58 by virtue of the sleeve 108 having a bottom flange received in a recess in the bottom of the control box and provided with O-ring seal with a retaining nut threaded on the upper end of the sleeve clamping the coil and other components together with the nut 124 engaging a thrust washer 126. A lower thrust washer 128 is provided at the lower of the coil with the coil including an internal sleeve 130 which is in engagement with the thrust washers 126 and 128. A spring 132 is provided between the coil and the bottom of the control box to enable movement of the coil 122 caused by expansion and the electric current. The valve seat 114 is installed on the piston 106 by the threaded stem 104 and is then clamped into the cavity 112 in which the cavity 112 overlaps into the volume 78 above the diaphragm 80 to provide pressure transmission.

Solenoid valve 100, when de-energized, is in the position shown in FIG. 6, that is, normally closed with piston 134 held against valve seat 136 by piston spring 138 thus precluding pressure transmission between volume 78 into recess 140 and thus over the valve seat 136 and through the passageway 142 into volume 74. The remaining structure of the solenoid valve 100 is the same as the solenoid valve 98 and when the solenoid valve coil is energized, a magnetic field is established that overcomes the force of spring 138 and causes piston 134 to move upward away from the valve seat 136. When this occurs, pressure in volume 78 is transmitted to outlet volume 74 and the pressures in these two volumes then become equal. As stated previously, the pressure in volume 74 is lower than that in volume 72 when there is flow so under these circumstances, the pressure in volume 74 will be slightly lower than the pressure in volume 78 so the unbalance of force across diaphragm 80 will lift the valve 68 from the valve seat 66. In other words, with the pressure of volume 74 being less than the pressure of volume 72 and with the volume 78 being communicated with the volume 74 and having a pressure equal thereto which is less than the pressure in volume 72, the reduced pressure in volume 78 as compared with volume 72 will overcome the spring 92 and lift the valve 68 away from the valve seat 66. The solenoid valve 100 is retained in position in the same manner as solenoid valve 98 with the valve seat 136 being machined into the valve body 56 and the cavity 140 in machined to overlap into volume 78 to provide a passage through which the pressure may be transmitted. The diaphragm 80 is held and sealed into position by the clamping action created between the control box 58, ring 90 and the structure of the top wall 76 of valve body 56. Both the ring 90 and the valve seat 114 are notched so as to provide passage for pressure transmission regardless of the position which they may be installed, that is, the notches in these two components need not necessarily be in any specific position. The cup-shaped member 82 and the retaining fastener 84 hold the diaphragm assembly together and cause smooth rolling action of the diaphragm. Leakage between inlet volume 72 through closed solenoid valve 98 into volume 78 is permissible so long as the leakage is less than the capacity of the opened solenoid valve 100 thus allowing considerable latitude and greatly reducing the accuracy with which the parts must be manufactured. Both solenoid valves 98 and 100 are sealed away from the interior of the control box and the coils of the solenoids valves have electrical leads connected into the circuit according to the electrical diagram to be described hereinafter.

The inlet compartment or volume 72 is provided with a flow switch assembly generally designated by numeral 144 and this switch is normally open when the valve 68 is closed and there is no flow. When valve 68 is open and fluid flows, the force of the flowing fluid impinges against a paddle 146 which is pivotally supported by a pivot pin 148 extending transversely of a cylindrical sleeve 150 positioned in an opening 152 in the top wall 76 of the valve body 56. A spiral coil spring 154 is interposed between the flat forward end of the paddle and a housing 156 forming its upper end and a pin or securing member 158 on the sleeve or well 150 to maintain the paddle 146 resiliently in a substantially vertical position as illustrated in FIG. 5. The upper end of the housing 156 is provided with a magnet 160 which pivots in a direction opposite to that of the paddle in response to fluid flow so that the magnet 160 will be pivoted toward a reed switch 162.

Figure 12:
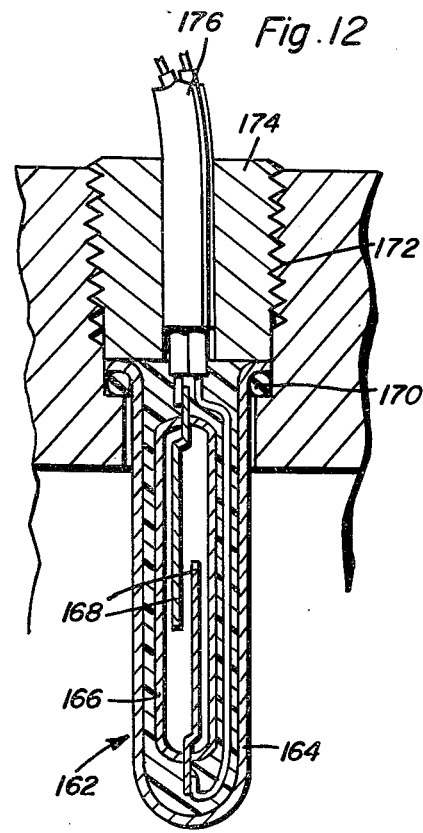
FIG. 12 is a fragmental sectional view of a reed switch taken substantially along section line 12—12 of FIG. 5.
Figure 7:
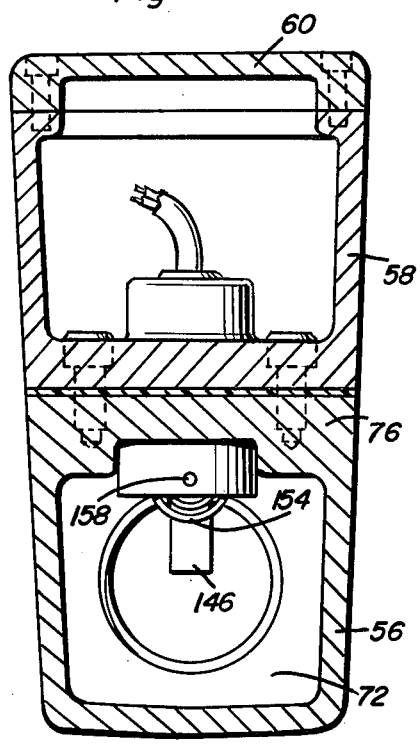
FIG. 7 is a transverse, vertical sectional view taken substantially upon a plane passing along section line 7—7 of FIG. 5 illustrating further structural details of the flow switch structure.

The reed switch 162 is illustrated in FIG. 12 and includes a well or tubular sleeve 164 and includes a tubular member 166 forming a mounting structure for the reed contact elements 168 with the contact elements being moved to a closed position when the magnetic field of the magnet 160 moves in proximity thereto. The tubular housing 166 for the reed switch is encapsulated in epoxy material in order to hermetically seal the switch and to prevent damage to the reed switch from vibration. The reed switch 162 is assembled as a unit and is positioned downwardly into sleeve 150 with the upper flared end of the well 164 being provided with an O-ring seal 170 where it rests against a threaded recess 172 in the bottom of the control box 58 with a retaining and sealing plug 174 being provided therefor which receives electrical conductors 176. Thus, the hold down plug or screw 174 holds the well in place and the control box 56 holds the sleeve 150 in place. The spring 154 retains the paddle 146 and magnet 160 in a vertical orientation until the force of liquid or fluids flowing through the port 64 will pivot the paddle 146 in a manner to move the magnet 160 toward the reed switch 162 thus closing the reed switch to indicate and sense the flow of fluid through the shutoff valve 30. The sensitivity of the flow switch 144 can be preset by the selection of an appropriate spring 154 so that even the most minute amount of flow can be recognized by the flow switch 144. The control box 58 is under atmospheric conditions and the seal 170 thus completely seals the liquid flow or fluid flow and the leads 176 are connected into the electric circuit in a manner described hereinafter. When flow ceases for any reason, the paddle 146 will return to its original no flow position and the magnet will thus move its magnetic field away from the reed switch 162 and the switch 162 then opens the circuit in which it is interposed.

Figure 9:
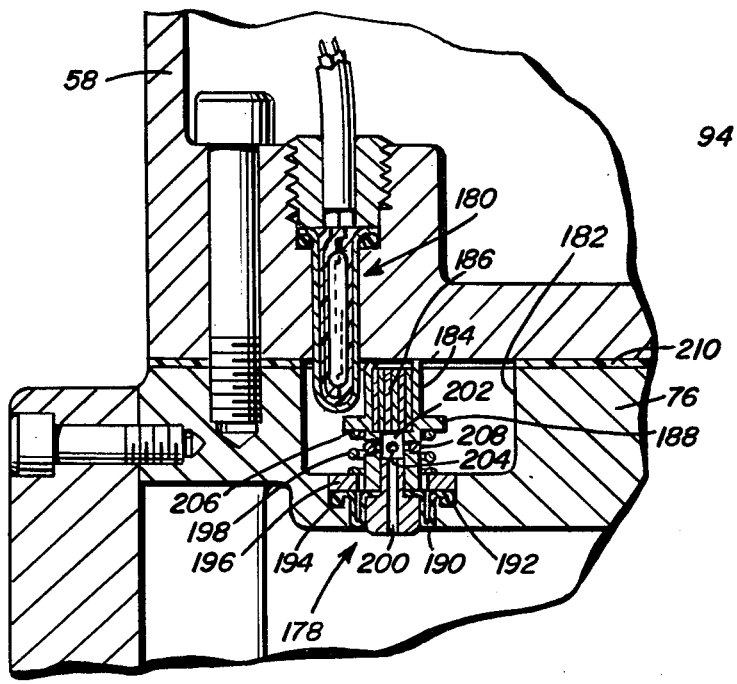
FIG. 9 is a fragmental sectional view taken substantially upon a plan passing along section 9—9 of FIG. 8 illustrating further structural details of the pressure drop switch.

A pressure drop switch generally designated by numeral 178 is positioned in the valve body 56 in the top wall 76 and in communication with the outlet compartment or volume 74 and, as illustrated in FIG. 9, utilizes a reed switch assembly generally designated by numeral 180 which is the same in construction as that utilized in conjunction with the flow switch with the lower end of the reed switch assembly 180 extending into a well or compartment 182 formed in the upper surface of the top wall 76 as illustrated in FIG. 9. The pressure drop switch 178 includes a plunger 184 provided with a magnet 186 in the upper end thereof and a peripheral shoulder 188 in the center thereof. The lower end of the plunger 184 extends through an opening in the lower end of the well 182 as designated by numeral 190 is sealed thereto by a rolling diaphragm 192 which has its inner periphery secured to the plunger and its outer periphery defined by a rib received in a upwardly opening groove or channel 194 with the diaphragm being retained in position by a diaphragm seal washer 196 which is held downwardly in place by a spring 198 which extends between the washer 196 and the lower surface of shoulder 188 thus biasing the plunger upwardly so that the magnet 186 will normally retain the reed switch assembly 180 in a closed condition.

Figure 8:
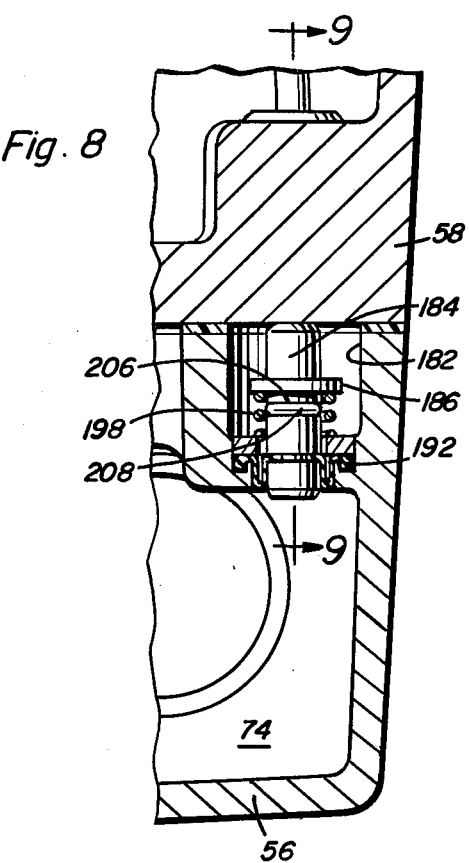
FIG. 8 is a transverse, sectional view taken substantially upon a plane passing along section line 8—8 of FIG. 5 illustrating the details of the pressure drop switch.

The bottom end of the plunger 184 is provided with a passageway 200 which extends upwardly into a hollow larger passageway or cavity 202 provided with a plurality of radial ports 204 therein which communicate the cavity 202 with a peripheral groove 206 having an O-ring 208 therein as illustrated in FIGS. 8 and 9.

With this construction, the magnet 186 located in the plunger 184 provides a magnetic field to close the reed switch 180 when the magnet 186 is in the position shown in FIG. 9. The rolling diaphragm 192 seals the cavity or well 182 from the outlet volume 74 and spring 198 acting against the shoulder 188 and against the diaphragm seal washer 196 positions and seals the diaphragm 192 in place and at the same time holds the plunger 184 and magnet 186 in an upward position against the bottom of the control box 58 so long as the pressure in volume 74 is equal to or only slightly less than pressure in cavity 182. Thus, in this condition, the pressure drop switch 178 may be considered a normally closed switch.

As fluid or liquid product flows into volume 74, it is free to flow into cavity 182 through passageway 200, into cavity 202 and into groove 206 through radial holes 204 connecting groove 206 with cavity 202. This fluid will then flow around and past O-ring 208 into cavity 182. The flow of the product is restricted from flowing quickly the opposite way from cavity 182 into volume 74 by the check valve action of O-ring 208 when cavity 182 is first filled, the pressures in cavity 182 and volume 74 are equal and as long as the pressure in the piping system in which the shutoff valve 30 is located remains constant or increases, the pressure balance between volume 74 and cavity 182 prevails. The pressures across the diaphragm 192 are equal as are the areas so the forces across the diaphragm are equal also. An unbalance of forces is provided by the spring 198 which pushes plunger 184 in the direction of the bottom of the control box 58 and the diaphragm 192 provides the flexible seal to permit this movement. The magnetic field of magnet 186 causes reed switch 180 to close and make and electrical contact. The pressure drop switch 178 is a normally closed switch even if there is not product pressure, spring 198 will hold plunger 184 against the bottom of control box 58 such that magnet 186 will keep switch 180 in a cloed position.

The above condition will remain until a sudden drop in pressure occurs in the system. When such a pressure drop does occur, the pressure in volume 74 immediately drops to equalize with the pressure in the system. The O-ring check valve 208 acts to restrict the flow of product out of the cavity 182 so that the pressure in cavity 182 remains higher than the pressure in volume 74. If the pressure differential is sufficient to overcome the predetermined force of spring 198, the plunger 184 will move in the direction of the spring and the magnet 186 along with its magnetic field will move away from the reed switch 180 and reed switch 180 then opens to break the electrical circuit in which it is interposed. The O-ring 208 does not provide a tight seal so that over a period of time which may be varied by the fit of the O-ring and the design of the groove 206, the pressure in cavity 182 will leak into volume 74 until the two pressures are equalized and the switch 178 in a sense "resets " itself.

The liquid product must be volatile, that is, one with a vapor pressure at the temperature at which the liquid is being handled. The liquid, or gas or air, trapped in cavity 182 under the conditions of a drop in pressure in volume 74 must be able to expand as a gas will, or vaporize to provide a gas that will expand, because cavity 182 increases in volume as plunger 184 moves away from reed switch 180. The volume in the cavity 182 is sufficiently large that the increase in volume caused by the displacement of the plunger 184 is incremental in relationship to the original volume of cavity 182. If this principle is not carefully considered in the design of cavity of 182, it is possible that the pressure in cavity 182 will reduce so much as it expands to fill the increased volume of cavity 182 as to fail to produce the force necessary to overcome the force of spring 198. In otherwords, the force developed from the pressure in the cavity after the cavity 182 has expanded due to downward movement of the plunger 184 must exceed the force from the pressure in the volume 74 plus the force of spring 198.

The control box 58 serves as a container and connection box for the electrical components and furnishes the clamping action to hold the solenoid valve, flow switch and pressure drop switch in place. A gasket 210 seals the surfaces of the control box 58 and the top wall 76 of the valve body 56. The control box 58 may be constructed so that it is explosion proof and provided with fitting 212 for the electrical conductor and the closure lid and the control box 58 may be assembled with relation to each other and with relation to the valve body by the use of suitable fastening bolts, cap screws or the like. All of the electrical components shown on the electrical schematic diagram in FIG. 13 enclosed within the dotted lines are contained within the control box 58 and the components outlined in solid line are within the magnetic starter which operates the motor of pump 38. The ends of the valve body 56 may be in the form of flanges 214 threaded for standard pipe thread or be plain fo welded pipe installation and may be sealed in relation to the body of the valve by O-rings 216 thereby facilitating the installation of the shutoff valve in various type of pipelines.

Figure 13:
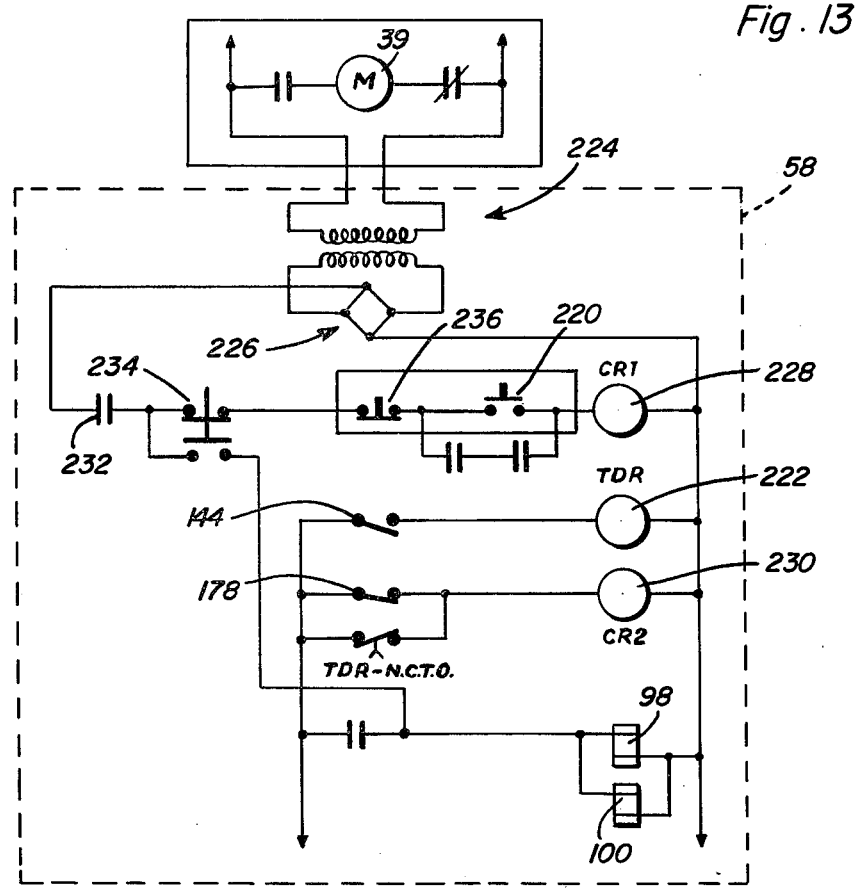
FIG. 13 is a diagrammatic view illustrating the control arrangement for the shutoff valve and related components of the system.

Referring now specifically to the diagrammatic illustration of the control arrangement in FIG. 13, during normal operation, a pump motor start switch 220 is depressed thus energizing the pump motor 39 for the pump 38. Closing the switch 220 also energizes solenoid valve 98 and solenoid valve 100 located inside the control box 58. Normally open solenoid valve 98 closes and normally closed solenoid valve 100 opens and by this operation, internal valve 68 opens to permit flow from the inlet volume or compartment 72 to the outlet volume or compartment 74. This flow moves the paddle 146 of flow switch 144 which, when closed, places pressure drop switch 178 into the electrical circuit. During normal operation, there is no excessive pressure drop across internal valve 68 and flow continues. When the hose end valve 54 is closed, flow ceases through the port 64 and the paddle of the flow switch 144 returns to its original or off position and opens the circuit to the pressure drop switch 178 and this cycle may repeat itself unless an excessive flow occurs.

If a rupture occurs downstream of shutoff valve 30, there is an abnormal operation of the system and under this condition, a higher than normal pressure drop occurs across the internal valve 68 which is detected by pressure drop switch 178 thus opening pressure drop switch 178 and de-energizing solenoid valves 98 and 100 and the motor 39 of pump 38. The solenoid valve 98 opens and solenoid valve 100 closes which action cause the internal valve 68 to close and stop all flow out of the compartment or volume 74 and thus, the hazard ceases.

There is a condition of higher than normal pressure drop across internal valve 68 that it normal and does not constitute a rupture downstream of the shutoff valve 30. When the pump 38 is first started during normal operation, hose end valve 54 is closed and the pump discharge passes through bypass valve 44 and bypass line 46 back into the tank 32. Bypass valve 44 is set at a differential pressure considered to be the maximum permissible for that particular system and service. Consequently, when a container 34 is connected to the hose end valve 54 and the hose end valve is opened, a momentary pressure drop higher than normal occurs as the discharge pressure adjusts to the lower pressure conditions. This is not an unsafe condition so pressure drop switch 178 is held out of the electric circuit for a predetermined number of seconds until the pressure becomes stable. Any additional pressure drop occuring after this initial pressure drop is sensed by the pressure drop switch 178 which de-energizes solenoid valves 98 and 100 so internal valve 68 closes and prevents further flow from the outlet compartment or volume 74.

The shutoff valve 30 and its internal valve 68 will always respond almost instantly to the second higher than normal pressure drop through shutoff valve 30 except for one condition. If there is a pre-existing rupture downstream of valve 30 or if the hose end valve 54 is accidentally left open, when the motor starter button 220 is pressed, the cycle begins as explained above. Solenoid valves 98 and 100 permit internal valve 68 to open and flow switch 144 detects flow and signals pressure drop switch 178 but it does so through time delay relay 222. Pressure drop switch 178 recognizes the abnormal flow and is in an open position. However, the time delay relay 222 must "time out" before pressure drop switch 178 can control the circuit to close the internal valve 68. Under this singular condition, shutoff valve 30 will flow liquid for those few seconds it takes for the time delay relay 222 to "time out". This is for a few seconds only which is predetermined in the selection of the time delay relay 222. The volume of liquid permitted to escape is relatively small comparted to an uncontrolled flow which would exist without valve 30. Further, should this unusual failure occur downstream of pump 38 with only a standard excess flow valve for protection, the flow will continue until this system is shutoff manually (assuming the flow to be less than the rated flow of the excess flow valve) and this situation would exist whether the pump 38 was running or not. In the present invention, with the pump 38 not running and with the electrical circuits open, the valve 30 would not have permitted any flow in the first place. In other words, the valve 30 is "fail safe" during a power failure.

Referring further to the electrical schematic illustration in FIG. 13, it is pointed out that the pump motor 39 is controlled by a magnetic starter inasmuch as the motor circuit is to be controlled by the action of the shutoff valve 30. This is due to the fact that a manual starter cannot be controlled by an electrical circuit whereas a magnetic starter can be. In this instance, the magnetic starter is energized by a 120 volt coil thus requiring that there be a source of 120 VAC single phase power available through a separate source or through a control transformer included in the magnetic motor starter enclosure. The separate pushbutton switch 220 shall either be incorporated in the enclosure of the magnetic motor starter or in a separate enclosure to be installed wherever desired.

The control box 58 will include a control transformer 224 and a rectifier 226 which converts 12 VDC into 15 VAC with the transformer having a 120 VAC output. Also, control relay 228 and control relay 230 are provided along with the time delay relay 222 which has one normally closed contact which opens in a predetermined time after the time delay relay has been energized. The contact is noted as TDR-NCTO which means "time delay relay-normally closed-time to open".

A thermal protector 232 is provided which is a heat sensing device such as when the ambient temperature exceeds a predetermined point, the protector 232 will open the circuit to solenoid valves 98 and 100 and the motor 39 to shutdown the system. When the temperature in that area returns to normal, the thermal protector 232 will automatically return to a closed position and the electrical system may again be energized by pressing start button 220. Any number of thermal protectors may be located around the area at strategic points and connected into the circuit at the point of thermal protector 232.

A deadman switch button 234 is provided in the pump motor circuit and has one normally open contact and one normally closed contact. When the button 234 is depressed and held manually in on position, the current bypasses pump motor 39 and directly energizes solenoid valves 98 and 100. The instant the button 234 is released, the system returns to the automatic mode. In addition to the start switch, a stop switch 236 is provided for manually de-energizing the system when desired.

When the pump motor magnetic starter is energized and the pump begins pumping and the piping system becomes pressurized, when hose end valve 54 is open there will be an instant drop in pressure which would cause pressure drop switch 178 to open which in turn would de-energize the magnetic starter and the system would shutdown. The delay relay 222 is a normally closed, timed-to-open contact and provides a circuit to control relay 230 (CR 2) energized which will permit the pump motor 39 to operate untill pressure drop switch 178 closes. It is noted that should there be a serious leak in the piping system when the pump 38 first starts, pump 38 will continue to operate until the timed-to-open contact (TDR-NCTO) opens which will be only a few seconds and then the motor will be stopped.

In operation, when the start button 220 is momentarily closed, control relays 228 and 230 are energized and their normally opened contacts are closed which (1) energizes the magnetic starter for the pump motor 39 and causes the pump to operate (2) completes circuit across the start button 220 which keeps control relay 228 energized, (3) energizes solenoid valves 98 and 100. The hose end valve 54 is then opened and the following occurs, (1) flow switch 144 closes thus energizing time delay relay 222 which will cause normally closed contact TDR-NCTO to open after a predetermined time in seconds has elapsed (2) pressure drop switch 178 will probably open the instant flow begins inasmuch as if there are no dangerous leaks, the pressure drop switch 178 will quickly close and this will occur before contact TDR-NCTO opens, (3) if there is a serious pressure leak pressure drop switch 178 will not close before contact TDR-NCTO opens and thus the electrical system will be de-energized and the internal valve 68 and the shutoff valve 30 will close, (4) if the pressure drop switch closes under normal conditions and the system remains energized, then subsequent to this, should a serious leak occur, pressure drop switch 178 will open to de-energize the system. When the hose end valve 54 is closed during normal operation, the following will occur, (1) flow switch 144 opens de-energizing time delay relay 222 which in turn causes TDR-NCTO to close, (2) pressure drop switch 178 remains closed, (3) solenoid valves 98 and 100 continue to be energized, (4) pump motor magnetic starter continues to be energized and the pump 38 continues to run.

As set forth previously, thermal protectors 232 may be installed inside of the control box 58 or in any other desired location or locations so that any point where abnormally high temperatures may occur, such as in a fire condition, the thermal protection will open the circuit to the shutoff valve 30 and the motor 39 of pump 38 which will close internal valve 68 and stop the motor as described and this will prevent the circuit from being closed until the temperature returns to normal. If desired, the circuit to the pump motor need not be included in the electrical system of valve 30, that is, the starter button may energize the pump motor and solenoid valves 98 and 100 but if the control system of valve 30 de-energizes the two solenoid valves, it need not stop the motor. Also, this system may be wired for 12 volt DC to simplify the electrical components such that it may turn off the ignition of an internal combustion engine driver as readily as stopping an electric motor. It also may be desirable to have a means of manually opening the shutoff valve 30 for emergency purposes or to vent the upstream pipe to handle maintenance or repairs of other equipment installed in the piping system. Such manual means must not be allowed to override the automatic features of the valve except under these extreme conditions and thus it must be nearly impossible to make the safety aspects of the shutoff valve inoperative. To accomplish this, the "deadman" pushbutton 234 may be installed on a sidewall of the control box and this button would require the operator to keep his finger against the switch button at all times the venting function is occurring so that should the operator remove his finger for any reason the system would instantly be back in automatic mode and the valve 30 would permit no further flow beyond it.

In this embodiment of the invention, the use of the two solenoid valves, the flow switch, the pressure drop switch and the association of the components are uniquely arranged and the specific structural features of the rolling diaphragms and the moving magnetic fields as well as the encapsulated reed switches and the specific mounting and association of these components also is unique in this field. This structure enables normal opening and closing of the hose end filling valve but will effectively shutdown the system and pump in the event of a rupture or leak downstream of the shutoff valve.

Figure 14:
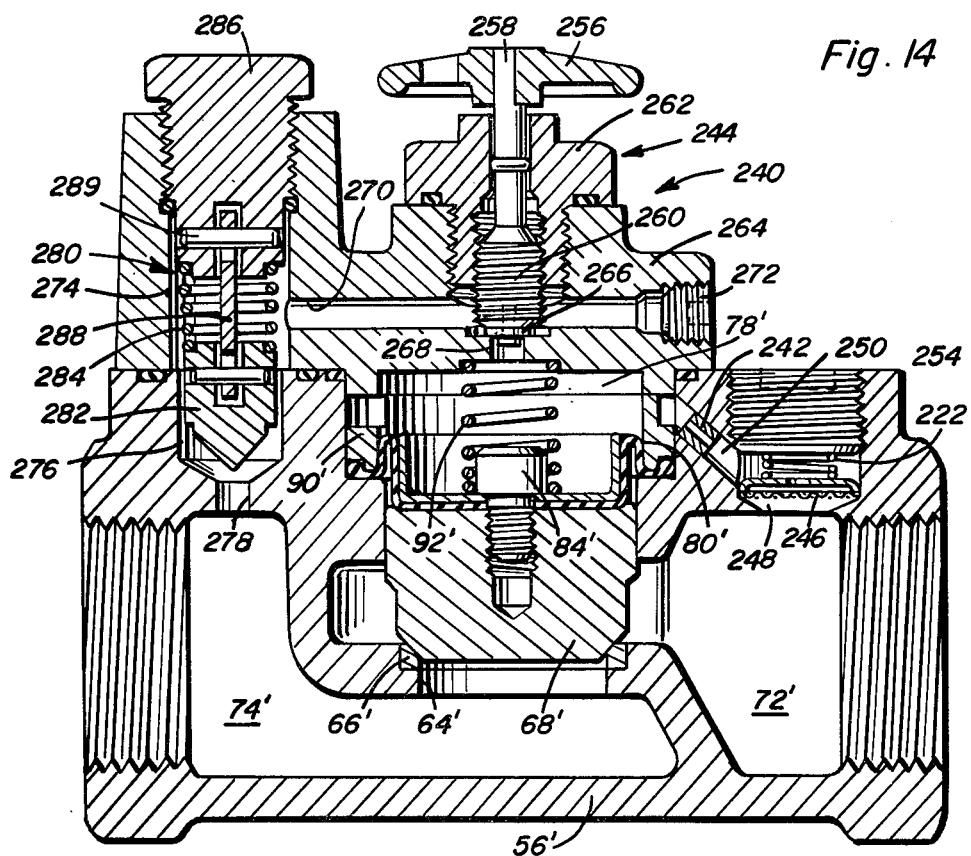
FIG. 14 is a longitudinal, sectional view of an external safety control valve of simplified construction and provided with a heat sensing valve which will close the main valve.

FIG. 14 illustrates a modified and simplified version of the electrically operated shutoff in which the internal valve, rolling diaphragm, retaining ring and retaining spring are employed in a similar valve body and primed reference numerals are employed where the structural components are the same with the shutoff valve 240 being installed in the same position as the shutoff valve 30 in FIGS. 1–13 and this valve serves the same general function except that this valve does not provide protection in the event of rupture of the piping downstream of the shutoff valve 240. Protection against such rupture shall be provided by another valve upstream of this shutoff valve and the main purpose of shutoff valve 240 is to provide a manual shutoff function and to provide protection downstream from excessive heat or fire. In a simplified explanation, liquid is pumped into the inlet compartment or volume 72' and also passes through an orifice 242 into communication with volume or compartment 78'. A manual valve assembly 244 is provided for the volume 78' and when this valve assembly is closed, the differential pressure across diaphragm 80' plus the force of spring 92' holds the valve 68' in a closed position against its valve seat 66' and no flow exists through port 64' into volume 74'.

To protect the orifice 242 from becomining clogged, a screen 246 is provided in an inlet opening 248 communicating the volume 72' with the passageway 250 in which the orifice 242 is installed. The screen 246 is held in place by a spring 252 and a screw threaded plug 254 to enable the screen to be removed for cleaning or replacement.

The valve assembly 244 includes a handle 256 mounted on the upper end of a valve stem 258 having a threaded and enlarged lower end portion 260 engaged with a corresponding internally threaded portion of a bonnet or adaptor 262 which in turn is threaded into a closure plate to top 264 for the valve body 56' and the volume 78'. The lower end of the top plate or member 264 includes a depending flange inserted partially into the cavity which receives the diaphragm ring 90' and its related components. The lower end of the valve stem 258 is provided with a valve member 266 which engages a port 268 communicating with the volume 78' and a channel or passageway 270 in the closure plate 264 with one end of the passageway 270 being closed by a screw threaded plug 272. The other end of the channel 270 communicates with a vertical bore or passageway 274 in the top plate 264 and also a passageway 276 in alignment therewith in the top portion of the valve body 56' which in turn is in communication with a port 278 communicating with the volume 74'. Thus, when the manual valve assembly 244 is in an open condition, liquid flows through port 268 in channel 270 and through bores or passageways 274 and 276 and through the port 278 into volume 74'. Thus, the pressures in volumes 72', 78' and 74' become equal if no flow exists across main valve 68'. If the piping downstream of the shutoff valve 240 is in a condition to permit liquid flow, the pressures in volumes 78' and 74' are nearly equal to each other and less than the pressure in volume 72' since orifice 242 provides for the flow into volume 78' from volume 72' being less than the flow out of volume 78' into volume 74'. The differential pressure so created across diaphragm 80' causes the main valve 68' to lift at a predetermined value. If the flow through the shutoff valve 240 is to be stopped manually, the handle 256 is operated to close the valve 266 to seal port 268 and the pressure in volume 78' almost immediately becomes equal to that in volume 72' and the main valve 68' closes. In lieu of a manual knob or handle 256, the valve 266 may be operated by a quick acting lever, an electrical solenoid or by any other desired means.

Shutoff valve 240 also includes a heat sensing valve assembly 280 incorporated into bores 274 and 276 and includes a valve 282 which will close against the bottom of the bore 276 thus closing the port 278 with the closure of the valve 282 acting in the same manner as when the valve 266 is closed, that is, the pressure in volume 78' and volume 72' will almost immediately equalize so that the main valve 68' will close. The valve 282 is spring biased towards a closed position by a spring 284 extending between the upper end of the valve 282 and a closure plug 286 for the upper end of the bore 274. The valve 282 is retained in open or retracted position by a fusible link 288 which extends between and has its ends received in bores in the facing ends of valves 282 and plug 286 respectively. The ends of the fusible link are secured in place by pins 289 which extend transversely of the valve 282 and the plug 286 respectively and through the respective ends of the fusible link 288. The fusible link 288 is so constructed that when a predetermined temperature is reached, it separates into two pieces which releases the force of spring 288 which forces the valve 282 to seal port 278 which will function in exact the same manner as when the valve 266 is closed to seal port 268. The fusible link will not reset itself and must be replaced with a new link should a fire or other high temperature condition cause it to separate. The heat sensing valve assembly 280 may be easily removed and a new fusible link placed in the assembly. O-ring seals are provided throughout the valve structure for sealing purposes to prevent leakage and to enable assembly and disassembly of the components when necessary. This valve provides a manually operated valve 266 or a heat sensing valve 282 to control the flow from volume 78' combined with the predetermined orifice size of orifice 242 which causes main valve 68' to open or close as directed by the position of valves 282 or 266.

FIGS. 15–21 disclose another safety control valve designated by reference numeral 290 and is termed an internal valve since it is intended to be installed inside of the product tank or vessel with a pump attached to an external flange portion although a pump need not be attached if one is not required. The valve 290 combines hydraulic action with electrical rather than electrical alone as illustrated in FIGS. 1–13 with this valve also serving to shutoff all flow of a hazardous nature when there is an excessive flow or when there is excessive temperature in the area of the valve or its vessel or it may be closed by de-energizing the solenoid valve either as a routine operation or under emergency conditions.

Figure 15:
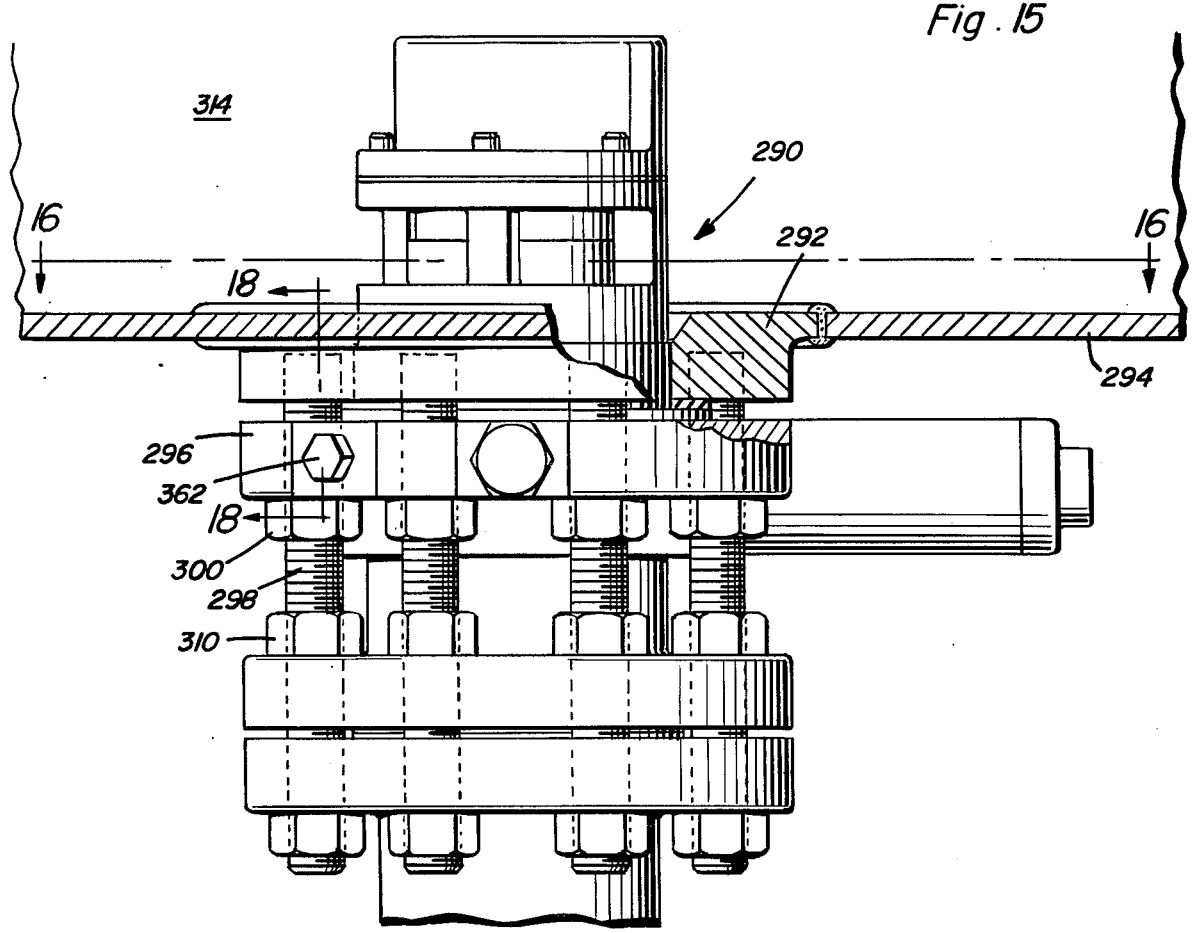
FIG. 15 is an elevational view of an internal safety control valve mounted through a tank wall with portions being broken away.
Figure 16:
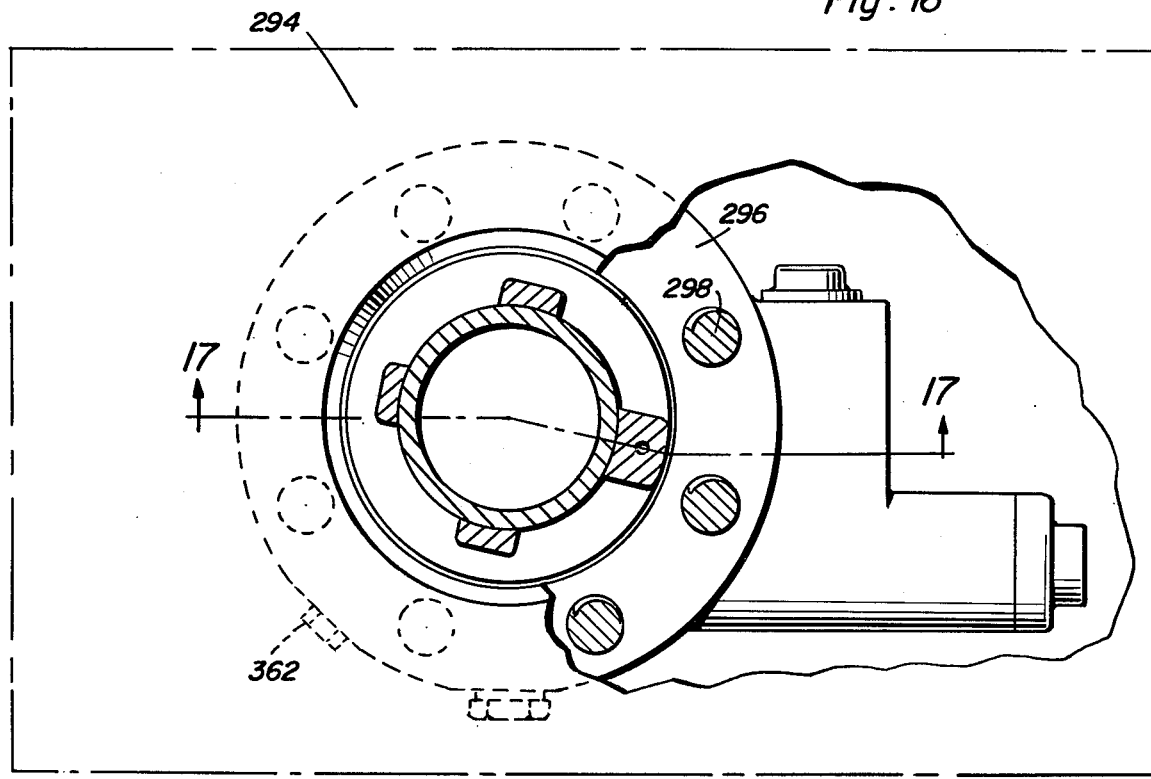
FIG. 16 is a sectional view taken substantially upon a plane passing along section line 16—16 of FIG. 15 illustrating the relationship of certain of the components of this embodiment of the invention.
Figure 17:
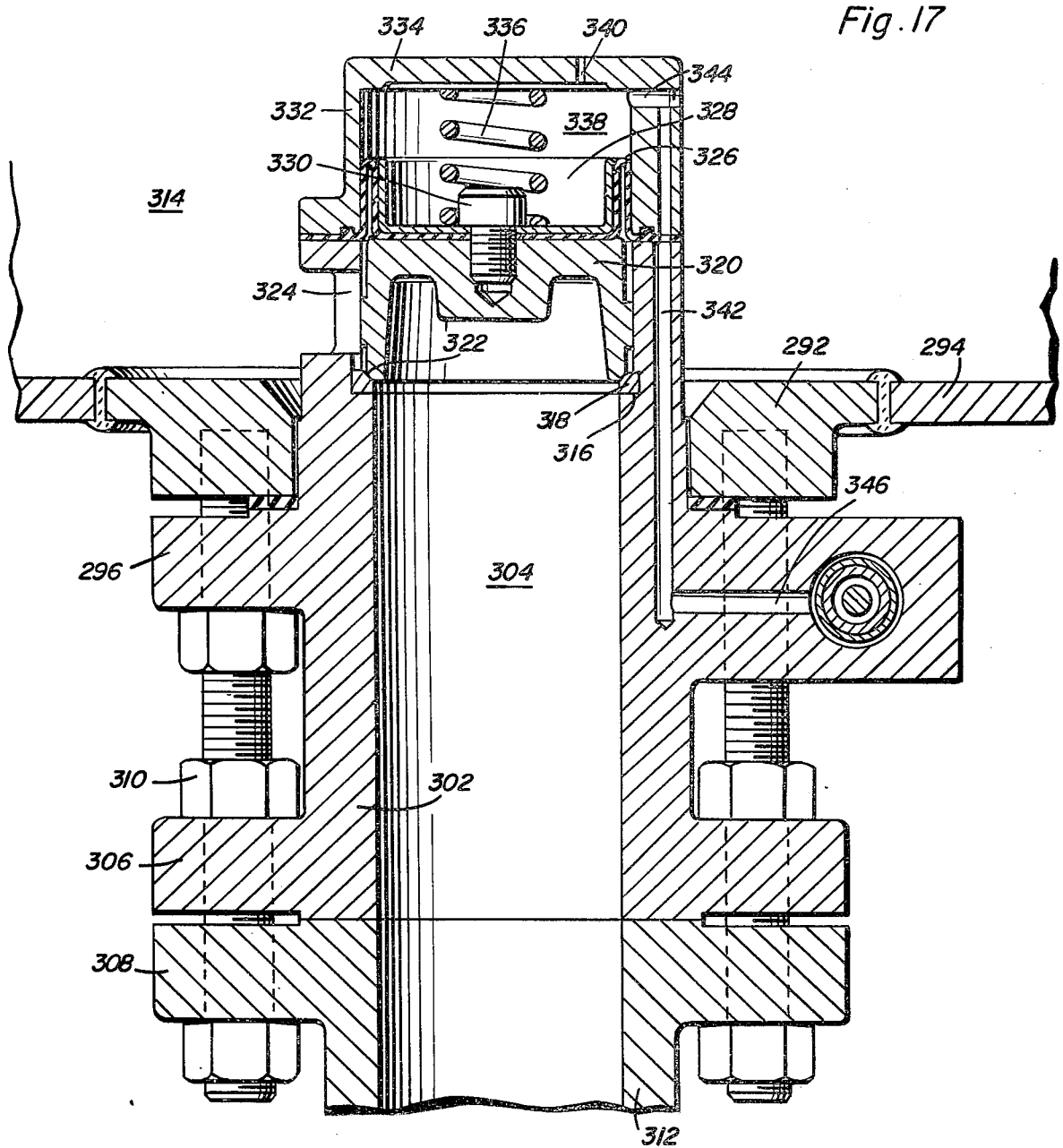
FIG. 17 is a transverse, sectional view taken substantially upon a plane passing along section line 17—17 of FIG. 16 illustrating specific structural details of this embodiment of the invention.
Figure 18:
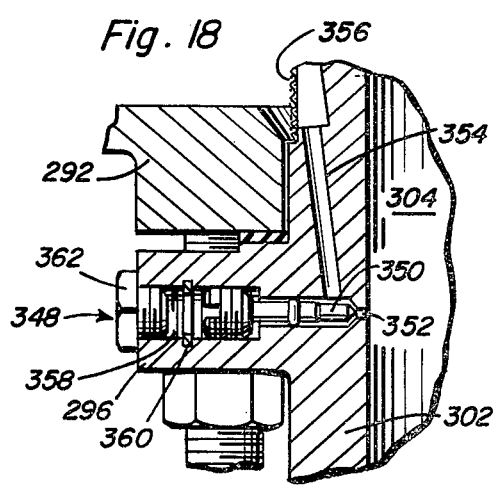
FIG. 18 is a fragmental sectional view taken substantially upon a plane passing along section line 18—18 of FIG. 15 illustrating the details of construction of a priming valve.
Figure 19:
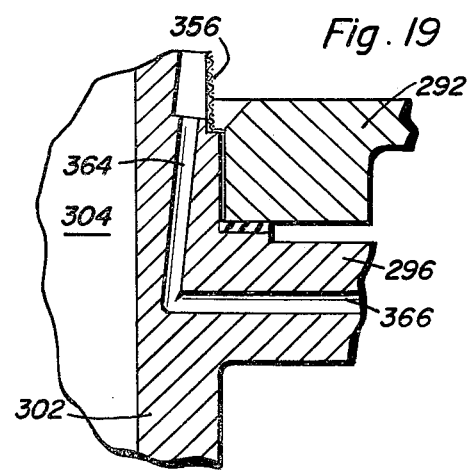
FIG. 19 is a fragmental sectional view of one of the passages in this embodiment of the invention.

In this arrangement, the shutoff valve is secured to a tank flange 292 welded or otherwise secured to the tank shell 294 as illustrated in FIG. 15. The internal valve is provided with a flange 296 bolted and gasketed to the flange 292 by suitable bolts or studs 298 which may be provided with weakness points below or inwardly of the nuts 300 which secure the internal valve flange 296 to the tank flange 292 such that a severe blow to the pump or piping attached will cause the studs to fail without damaging the internal valve or vessel shell 294. As illustrated in FIG. 17, the valve 290 includes not only the flange 296 attached to a tubular body 302 which defines a volume 304 but the outer end of the tubular member 302 is provided with a flange 306 to which a pump flange or piping flange 308 may be connected by the studs 298 and nuts 310 associated therewith so that the piping or pump inlet 312 is in communication with the volume 304. The inner end of the tubular member 302 extends interiorly of the tank flange 292 and is in communication with the interior volume 314 of the tank. The interior of the tubular member 302 is provided with a peripheral shoulder 316 adjacent its upper end for receiving a valve seat 318 associated with a vertically movable main valve 320 which is cup-shaped in configuration and provided with a tapered or beveled face 322 for engagement with the valve seat 318 with the structure of the valve and valve seat being similar in operation to the internal valves illustrated in the embodiments illustrated in FIGS. 1–14. The flow path from the tank volume 314 to the volume 304 is through inlet ports 324 in the portion of the tubular member 302 above the valve seat 318 so that when the valve 320 is in a raised or opened position, flow may occur between the volumes 314 and 304. The upper end of the valve 320 is connected with a rolling diaphragm 326 having its central portion secured to the valve 320 by cup-shaped member 328 and fastener bolt 330. The outer periphery of the rolling diaphragm 326 is secured to the upper end of the tubular member 302 by a cylindrical cap 332 having an upper end 334 abutting the upper end of a coil compression spring 336 and defining a volume 338 above the diaphragm 326. The lower end of the cap 332 may be flanged and secured to the upper end of the tubular member 302 by suitable fastening bolts or the like with the outer periphery of the diaphragm 326 being sealed between the juncture of the upper end of the tubular member 302 and the lower end of the cap 332. The top wall 334 is provided with a small orifice 340 which communicates the tank volume 314 with the volume 338 and the tubular member 302 and the cap 332 includes a longitudinal passage 342 formed therein having the upper end extending through the cap and extending inwardly at 344 for communication with the volume 338. The lower end of the passage 342 extends radially outwardly at 346 for a purpose described hereinafter.

A priming valve generally designated by numeral 348 is oriented in flange 296 and includes a needle valve 350 associated with an orifice 352 communicating with volume 304 below the main valve 320. The orifice 352 is in communication with an upwardly inclined passage 354 extending above tank flange 292 and communicating with the exterior of the tubular member 302 with a strainer screen 356 overlying the upper enlarged end of the passage 354 so that the tank volume 314 is communicated with the piping volume 304 through the passage 354 under the control of the priming valve 348. The outer end of the needle valve 350 is threadedly engaged with the internally threaded bore 358 in the flange with a screwdriver kerf or the like being provided on the outer end of the needle valve for adjustment purposes. A split spring retainer 360 is provided in the bore 358 for retaining the needle valve therein and a dust cap or plug 362 is provided for the outer end of the bore 358. After the valve 290 is installed and the pump or piping 312 attached, the priming valve 348 is opened to permit product flow from the tank volume 314 into the pump and piping volume 304 until the pressures equalize in both volume. Also, product will flow from the tank volume 314 through a passage 364 communicating with the peripheral screen strainer 356 at its upper end and extending radially outwardly at 366 at its lower end into flange 296 for communication with a pressure drop valve to be discussed hereinafter with the structure of the priming valve being illustrating in FIG. 18 and with the oppositely oriented passageway 364 being illustrated in FIG. 19. It is pointed out that the passage 364 and the passage 366 generally parallel passages 342 and 346 as illustrated in FIG. 20.

Volume 304 is also communicated with a heating sensing valve generally designated by numeral 368 as illustrated in FIG. 20 in a passage 370 and this passage is communicated with a passage 372 communicated with a solenoid valve arrangement generally designated by numeral 374. The solenoid valve 374 is communicated with a pressure drop valve 376 as illustrated in FIG. 20 so that the pressure from piping volume 304 will flow into the passages and volumes of the pressure drop valve 376, solenoid valve 374 and heat sensitive valve 368 so that they are all equal in pressure with the solenoid valve 374 being in a de-energized, closed position. The solenoid valve 374 and pressure drop valve 376 are positioned in a lateral enlargement or housing 378 formed on the flange 296 with the passage 372 being generally tangential to the volume 304 and the solenoid valve 374 being generally in alignment therewith and the pressure drop valve 376 being generally perpendicular to the passageway 372.

The solenoid valve includes a coil 380 electrically connected to a suitable electrical circuit through a conduit adaptor 382 at an outer end thereof. A rigid sleeve forming member 384 is disposed interiorly of the coil and has its inner end threaded into an internally threaded portion 386 of the housing 378 thus defining a chamber 388 communicated with the passage 372 and provided with a valve seat 390 at the juncture between the passage 372 and chamber 388.

The sleeve 384 includes movable piston 392 with a spring 394 biasing the piston 392 toward the valve seat 390 so that the valve member 396 on the end of the piston 392 will engage the valve seat 390 thus isolating the passage 372 from the chamber 388 until the coil 380 is energized.

The chamber 388 is provided with a lateral port 398 which communicates with the interior of a bore 400 which receives the pressure drop valve 376.

The pressure drop valve 376 includes a valve body 402 inserted into the bore 400 and bottoms against the lower end thereof with a gasket 404 forming a seal therewith. The lower end of the valve body 402 is provided with a port 406 which guidingly receives the lower reduced and flattened end 408 of the valve plunger 410. The valve plunger 410 is generally cylindrical and has a pair of rolling diaphragms 412 and 414 secured to the periphery thereof in longitudinally spaced relation with the outer peripheral edges of the diaphragms 412 and 414 being secured between sections of the valve body 402 and the inner peripheries of the diaphragms being secured to the plunger by retaining rings 416 and 418. The lower retaining ring 416 is provided with a valve member or face 420 adapted to engage a valve seat 422 in the interior of the body 402 with the closed position of this valve being illustrated in FIG. 21. A spring 424 biases the valve plunger 410 to an upper position. As illustrated, the interior of the valve body 402 is hollow and receives the valve plunger and the structure of the rings and diaphragms provides movement for the plunger and seals between the plunger and valve body. Also, the valve body 402 is less in diameter than the bore 400 thus defining an annular space 426 with a radial port 428 extending through the valve body and communicating the space 426 with the interior of the valve body and the with the port 406 when the valve face 420 is spaced from the valve seat 422. This space 426 is in communication with passage 346 and passage 342 which communicates with passage 344 and volume 338 above the main valve 320. The plunger 410 is spaced concentrically from the central portion of the valve body 402 with the space therebetween being designated by numeral 430 in the form of an annular space or orifice extending between the two diaphragms with the outer periphery of the plunger 410 including a peripheral projection or rib 432 thereon which provides a flow path between the chambers or volumes defined between the projection 432 and the diaphragms 412 and 414. This entire space is filled with a high viscosity flowable material, such as glycerin, and serves as a time delay for movement of the valve plunger 410 in a manner described hereinafter.

The valve body 402 is retained in the bore 400 by an internally threaded retaining ring 434 screwed into the bore 400 into abutting engagement with the upper end of the body 402 with the upper end of the body and the retaining ring including a hollow bore or passage 436 which defines a volume 438 which is in communication with passage 366 and passage 364 through a port 440.

By any suitable means such as a 12 volt DC battery in a tank truck or the like, solenoid valve 374 is energized when the pump is started by closing a suitable electrical switch thus opening the solenoid valve which is illustrated in FIG. 21. Normally, the truck pump is powered by a power takeoff and the switch may be attached to the mechanism that engages the power takeoff which will also energize solenoid valve 374. Any other means of accomplishing the same result may be used.

The pressure in volumes 304 and 338 and all connecting passages is the same with pressure flowing into volume 338 through orifice 340 and into volume 304 through priming valve 348 and into the pressure drop valve and the heat sensing valve and solenoid valve through the passages. As in the other embodiments of the invention, when the pressure in volume 304 and volume 338 is slightly lower than that of tank volume 314, main valve 320 will open. Thus, when the pump is started, the pressure in volume 304 reduces from the rapid acceleration of the liquid passing through the pump, and main valve 320 will open because the pressure in volume 338 reduces nearly as fast as does that in volume 304. The flow through orifice 340 is considerably smaller than that through passages 342 and 372 and thus the pressure in volume 338 reduces sufficiently to cause an unbalance of forces on main valve 320 and main valve 320 thus opens. Any time, either during routine or emergency conditions, solenoid valve 374 is de-energized, it closes and stops flow from volume 338 through passage 342 into passage 372 and the pressure in volume 338 quickly becomes equal to that in the tank volume 314 and main valve 320 closes due to the unbalance provided by spring 336 and this valve remains closed regardless of the pressure condition in volume 304. Solenoid valve 374, in addition to its normal start and stop switch linked with the pump starting lever, may have any number of "maintained contact" stop switches located at various points around the vehicle, which by simply pushing the switch button will de-energize the solenoid and close the main valve 320. Along with these remotely located emergency stop switches, heat sensing or detecting switches may be installed to de-energize solenoid valve 374 under excess temperature conditions, such as a fire in the area.

The main valve 320 will also close if either the pressure drop valve 376 or the heat sensing valve should close. The closing of either of these two valves will stop pressure transmittal from volume 338 to volume 304 and thus the pressure in volume 338 will quickly equal the pressure in tank volume 314, and main valve 320 will close as previously described.

The heat sensitive valve 368 is identical to the heat sensing valve 280 illustrated in FIG. 14 and operates in exactly the same manner.

In this arrangement, main valve 320 may be closed under the following conditions, (1) when solenoid valve 374 is de-energized by the pump starting lever, switch or like and under normal operating conditions, (2) when solenoid valve 374 is de-energized by a remotely located stop switch by manual operation under emergency conditions or automatically if the temperature in the area exceeds a predetermined temperature, (3) when excessive pressure drop occurs as the result of uncontrolled flow through main valve 320 which causes pressure drop valve 376 to close thus closing main valve 320, (4) when excessive temperature exists near the internal valve and heat sensing valve 368 closes thus causing main valve 320 to close, (5) when any of the above conditions exist the main valve 320 will not open accidentally but must be opened knowingly.

In a more detailed description of the operation of the pressure drop valve 376, pressure is transmitted through orifice 340 into volume 338 from the tank volume 314 and this pressure is also transmitted through passage 344 into passage 342 and passage 346 into the annular space 426 surrounding the valve body 402 and through port 428, chamber 388, and passages 372 and 370 where it connects with volume 304 as shown in FIGS. 20 and 21. Tank pressure from tank volume 314 flows through passage 364 and 366 and into volume 438 which has its outer extremity defined by the threaded plug 439 as illustrated in FIGS. 20 and 21. Thus, under normal static conditions, the pressures are equal in all volumes and passages so that the force from the pressure in volume 438 against the valve plunger 410 is equal to the force against valve face 420 on the plunger which is the same area. The spring force from spring 424 holds the valve face 420 and the plunger away from the valve seat 422. As stated previously, the volume around plunger 410 and between the two rolling diaphragms 412 and 414, designated as volume 430, is filled with a liquid of very high viscosiy, such as glycerine. Product flow from passage 366 into passage 346 or into passage 372 is prevented by the two rolling diaphragms. If there is a pressure drop between passage 366 and 372 exceeding the predetermined force of spring 424, the valve plunger 410 and its valve face 420 will move toward the valve seat 422 and close off flow through port 406 into chamber 388 or passage 372 and the main valve 320 will close as previously described. The excessive pressure drop causes pressure drop valve 376 to close could come from a rupture or failure downstream of the internal valve 290 of sufficient magnitude to be considered hazardous or from start up of the pump. Accordingly, there is one condition when the pressure drop valve 376 must not close and that is the few seconds immediately after the pump is started, when the pump will reduce the pressure in volume 304 sufficiently to cause pressure drop valve 376 to close if it were not otherwise prevented from doing so. Thus, there has been included a "time delay relay" within the pressure drop valve 376 in which the volume 430 is filled with glycerine and has a controlled annular area or orifice between the peripheral rib 432 on the plunger 410 and the interior of the central portion of the valve body 402. Thus, the motion of the valve plunger 410 and the valve face 420 toward the valve seat 422 is slowed down or delayed a predetermined number of seconds, because of the friction of the glycerine flowing past the annular rib or projection 432 which actually defines the annular orifice 430 between it and the interior surface of the valve body. During normal operation, the pressure in volume 304 which is so quickly reduced when the pump is started will stabilize to a predetermined pressure condition after just a few seconds and the force from pressure of volume 304 against valve face 420 plus the force of the spring 424 and normal pumping operating conditions will maintain the valve 320 open. Once the pressure drop valve 376 has actually closed, it will not open again until the rupture is repaired and the pressure of volume 304 is equalized with the tank volume 314 and volume 338 through the priming valve 348. As set forth previously, the heat sensitive valve is the same as that disclosed in detail in FIG. 14 and the same reference numerals are applied in FIG. 20 to the major components. The fusible link will melt at a predetermined temperature which releases the force of the spring and closes the valve so that flow or pressure transmittal is stopped between volume 304 and 338 and main valve 320 then closes. The plug of the valve may be constructed of aluminum of other material which will quickly transmit temperature to the fusible link and this valve cannot be reset accidentally since it is necessary to replace the fusible link. In doing this, the priming valve 348 must be closed and the pressure in volume 304 reduced to atmospheric pressure by bleeding to the atmosphere. After this is done, the plug may be removed and a new fusible link installed and after the heat sensing valve 368 has been replaced, the system may be repressured if the cause of excessive temperature is removed and if is otherwise safe to do so.

With this arrangement, the time delay device is hydraulic in nature and the only electrical component involved is the solenoid valve which may be operated from any suitable electrical source. This enables this form of the invention to be effectively installed in a tank that is mounted on a truck or similar vehicle which enables the tank to be driven to a site of a container to be filled and this device will effectively shutdown the system and keep the main valve closed in the event of excess flow downstream of the shutoff valve 290 or in the event of high temperature conditions by the heat sensing valve 368 or in response to other emergency conditions by switches which may be either manually or automatically actuated in response to high temperatures or the like in other areas. The various components are constructed from materials which are not deteriotated by the materials flowing therethrough and the components may be easily assemblied and disassembled for replacement or repair. The assembly employed in FIGS. 1-13 involves primarily electrical controls whereas the assembly illustrated in FIGS. 15-21 includes a hydraulic time delay or control in which an electrical source is provided for the solenoid valve and for any desired remote control arrangements. In each embodiment of the invention the main valve includes a rolling diaphragm structure associated therewith for maintaining the seal between the outlet volume and a volume on the opposite side of the rolling diaphragm with the pressure differential between these volume varying so that an unbalance will occur under excess flow conditions and under certain other conditions to close the main valve.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A shutoff valve for installation in a fluid flow line for controlling flow in the flow line, said valve comprising a valve body having an opening therein defining a valve seat, a valve member movably mounted in said body for movement between a closed position in engagement with the seat and an open position spaced therefrom, said valve body including an inlet volume on one side of the valve seat and valve member and an outlet volume on the other side thereof, said valve body including a cavity movably receiving the valve member and defining a volume isolated from the inlet volume and outlet volume, means sealing the valve member to the cavity while permitting movement in relation to the valve seat, spring means biasing said valve member towards the valve seat to close the valve member when the pressure in the cavity is balanced with or greater than the pressure in the inlet volume, restrictive orifice means communicating the cavity with the inlet volume to equalize pressures therein and a passageway communicating the cavity with the outlet volume to reduce pressure in the cavity when pressure in the outlet volume reduces during normal flow of fluid from the outlet volume when the passageway is open thus causing the pressure of the inlet volume against the valve member to overcome the spring means and move the valve member to open position to enable flow through the valve, a manually operated valve means in said passageway in alignment with said valve member, and a temperature sensitive valve spaced from the valve means for interrupting communication between said cavity and said outlet volume to close the valve member if high temperature conditions occur, said heat sensitive valve being disposed adjacent the outlet volume to sense the temperature thereof.

2. The structure as defined in claim 1 wherein said temperature sensitive valve includes a fusible link retaining a valve member in open position.

3. The structure as defined in claim 2 wherein said means sealing the valve to the cavity includes a rolling diaphragm having an outer peripheral edge secured to the periphery of the cavity and an inner periphery secured to the valve member.

4. A shutoff valve for a flow line comprising a valve body having an inlet and an outlet spaced therefrom and separated therefrom by a valve seat, a valve member movably mounted in said body for selective engagement with the valve seat, said valve body including a cavity therein communicated with the inlet through a passage having a flow capacity less than the flow capacity through the valve, means sealing the valve member with respect to the cavity whereby the valve member will be moved in relation to the valve seat in response to pressure changes in the cavity, spring means biasing the valve member towards the valve seat for closing the valve member when the pressure in the cavity is equal to the pressure in the inlet, and means communicating the cavity with the outlet through a passage having a flow capacity greater than the flow capacity between the cavity and the inlet thereby reducing the pressure in the cavity and retaining the valve member in open position when a flowable product is discharging from the outlet, said valve member being inaccessible from the exterior of the valve body and opened and closed in response to flow conditions from the outlet of the valve body, and a manually operated valve in the passage communicating the cavity with the outlet for selectively interrupting flow between the cavity and outlet thereby enabling the pressures in the cavity and inlet to equalize and the biasing means to move the valve member into engagement with the valve seat thereby interrupting flow in the flow line, said valve in the passage communicating the cavity with the outlet including a manually operated valve member including actuating means extending externally of said valve body, said passage between the cavity and the outlet including a port defining a valve seat above and in alignment with the valve member, said manually operated valve member being selectively movable into engagement with the port in said passage, said actuating means including a stem connected to the manually operated valve member and extending externally of the valve body for actuation, and a heat sensitive valve means downstream from the manually operated valve member closing the passage to the outlet when the ambiant temperature conditions exceed a predetermined value.

5. The structure as defined in claim 4 wherein said heat sensitive valve means includes a valve member spring biased to passage closing position, and a fusible member retaining the valve member in passage opening position.

6. The structure as defined in claim 5 wherein said fusible member is in the form of a tension link interconnecting the valve member and a removably plug thereby enabling replacement of the link.

7. The structure as defined in claim 6 wherein said manually operated valve member and said heat sensitive valve means are spaced from each other with the heat sensitive valve means being disposed adjacent the outlet for sensing temperature of the products in the flow line.

8. The structure as defined in claim 7 wherein said cavity reciprocally receives a portion of said valve member, said means sealing the valve member with respect to the cavity comprising a diaphragm having an inner portion secured to the valve member and an outer portion secured to the cavity with the diaphragm being flexible and dimensioned to enable movement of the valve member between open and closed positions.

9. The structure as defined in claim 8 wherein the passage between the cavity and inlet includes a restricted size orifice, and strainer means preventing entry of foreign material into the orifice.

10. The structure as defined in claim 9 wherein said valve body includes a closure top plate defining the upper end of said cavity, said plate having the port formed therein and said passage extending from the port toward the outlet, said spring means including a coil spring having one end engaged with the plate in encircling relation to the port, said heat sensitive valve means including a screw threaded plug in said body generally in spaced parallel relation to said stem and terminating exteriorly of the body to enable access thereto.

* * * * *